United States Patent [19]

Moshinsky

[11] Patent Number: 4,501,784

[45] Date of Patent: Feb. 26, 1985

[54] DISPERSION OF REFLECTED RADAR

[76] Inventor: Igor B. Moshinsky, 18703 Candle View, Spring, Tex. 77373

[21] Appl. No.: 482,176

[22] Filed: Apr. 5, 1983

[51] Int. Cl.$^3$ .................... B32B 3/30

[52] U.S. Cl. .................... 428/156; 244/117 R; 343/18 B; 428/179; 428/212

[58] Field of Search .................... 428/156, 174, 179, 180, 428/913, 212; 244/117 R, 126, 133, 200; 343/18 B, 18 E, 18 A, 18 R

[56] References Cited

U.S. PATENT DOCUMENTS

| | | | |
|---|---|---|---|
| 2,665,383 | 1/1954 | Marie | 343/18 B |
| 3,387,186 | 2/1967 | Straub | 343/18 R |

*Primary Examiner*—Paul J. Thibodeau
*Attorney, Agent, or Firm*—Neal J. Mosely

[57] ABSTRACT

A structural material is provided with a surface having a selected pattern of indentations which disperse a radar beam on reflection therefrom so that the radar signal returned to the radar apparatus has an intensity less than 0.1% of the signal reflected from a smooth surface. The material is covered with a plurality of closely spaced indentations and/or raised portions in a random or systematic pattern having a depth or height or a radius of curvature in the range from about 0.2 to about 5.0 times the length of the waves used for normal radar detection of distant objects, e.g. airplanes, missiles, etc. Radar wave lengths are typically in the range from several millimeters to several hundred millimeters. The indentations or raised portions vary in depth or radius of curvature within the stated range and are variably positioned on the surface. A radar signal reflected from a properly constructed surface of this pattern is 99.995% less than a radar signal reflected from a smooth surface. For aerodynamic applications, the cross-section of the indentations and/or raised portions should be configured to provide aerodynamic efficiency in the direction of air flow over the surface in normal use.

20 Claims, 15 Drawing Figures

$A_{RS}$ = AMPLITUDE REFLECTION FROM SMOOTH SURFACE $$A_{RI} = \frac{A_{RS}}{(1 + D/R)}$$

$A_{RI}$ = AMPLITUDE REFLECTION FROM IRREGULAR SURFACE

DISPERSION OF REFLECTED RADAR

BACKGROUND OF THE INVENTION

1. Field of the Invention

This invention relates to new and useful improvements in materials of construction to provide low radar reflectivity.

2. Brief Description of the Prior Art

The prior art in anti-radar defenses has included efforts to produce electronic interference with radar signals in an attempt to cancel out such signals. Also, efforts have been made to absorb radar signals using special types of materials. The scattering of metal foils from aircraft has also been used to give false radar signals as to the location, speed and number of military aircraft.

It has been reported in the literature, viz. "Applied Geophysics(USSR)", Vol. 58, Moscow 1970, pp. 97–104, relating to reflected signals in geophysical prospecting that seismic signals are reflected in a dispersed manner from an irregular geological interface according to a mathematical formula which relates the amount of dispersion of the reflected signal to the degree of irregularity of the interface. This phenomenon has also been utilized in suppressing multiple reflections in marine seismic exploration, see Igor B. Moshinsky et al. Canadian Patent Application, Ser. No. 336,129, filled Sept. 21, 1979, now Canadian Pat. No. 1,149,925, issued July 14, 1983.

The literature does not indicate the possible application of this phenomenon to the dispersion of reflected radar signals.

SUMMARY OF THE INVENTION

It is one object of this invention to provide a construction material having a surface configured to reflect radar signals in a highly dispersed manner.

Another object of this invention is to provide a construction material having a surface with a selected pattern of indentations and/or raised portions which disperse a radar beam on reflection therefrom so that so that the radar signal returned to the radar apparatus has an intensity less than 0.1% of the signal reflected from a smooth surface.

Another object of this invention is to provide a construction material covered with a plurality of closely spaced indentations and/or raised portions in a random or systematic pattern, wherein the indentations and/or raised portions have a depth or height or a radius of curvature in the range from about 0.2 to about 5.0 times the length of the waves used for normal radar detection of distant objects, e.g. airplanes, missiles, etc.

Still another object of this invention is to provide a construction material, for aerodynamic applications, covered with a plurality of closely spaced indentations and/or raised portions in a random or systematic pattern, wherein the indentations and/or raised portions have a depth or height or a radius of curvature in the range from about 0.2 to about 5.0 times the length of the waves used for normal radar detection of distant objects, e.g. airplanes, missiles, etc. and a smooth, aerodynamically efficient cross-section in the direction of air flow over the surface in normal use.

Still another object of this invention is to provide an aircraft, missile or the like, having its external surface of a material having a surface configured to reflect radar signals in a highly dispersed manner.

Still another object of this invention is to provide an aircraft, missile or the like, having its external surface of a material having a surface with a selected pattern of indentations and/or raised portions which disperse a radar beam on reflection therefrom so that the radar signal returned to the radar apparatus has an intensity less than 0.1% of the signal reflected from a smooth surface.

Still another object of this invention is to provide an aircraft, missile or the like, having its external surface of a construction material covered with a plurality of closely spaced indentations and/or raised portions in a random or systematic pattern, wherein the indentations and/or raised portions have a depth or height or a radius of curvature in the range from about 0.2 to about 5.0 times the length of the waves used for normal radar detection of distant objects, e.g. airplanes, missiles, etc.

Still another object of this invention is to provide an aircraft, missile or the like, having its external surface of a construction material covered with a plurality of closely spaced indentations and/or raised portions in a random or systematic pattern, wherein the indentations and/or raised portions have a depth or height or a radius of curvature in the range from about 0.2 to about 5.0 times the length of the waves used for normal radar detection of distant objects, e.g. airplanes, missiles, etc. and a smooth, aerodynamically efficient cross-section in the direction of air flow over the surface in normal use.

Other objects of this invention will become apparent from time to time throughout the specification and claims as hereinafter related.

The above stated objects and other objects are accomplished by a structural material provided with a surface having a selected pattern of indentations and/or raised portions which disperse a radar beam on reflection therefrom so that so that the radar signal returned to the radar apparatus has an intensity less than 0.1% of the signal reflected from a smooth surface. The material is covered with a plurality of closely spaced indentations and/or raised portions in a random or systematic pattern. The indentations and/or raised portions have a depth or height or a radius of curvature in the range from about 0.2 to about 5.0 times the length of the waves used for normal radar detection of distant objects, e.g. airplanes, missiles, etc. The radar wave lengths are typically in the range from about several millimeters to several hundred millimeters. The indentations and/or raised portions vary in depth or radius of curvature within the stated range and are variably positioned on the surface. A radar signal reflected from a properly constructed surface of this pattern is 99.995% less than a radar signal reflected from a smooth surface. Where the radar dispersing surface is to be used in aerodynamic applications it is necessary to further configure the cross-section of the indentations and/or raised portions to provide a smooth aerodynamically efficient cross-section in the direction of air flow over the surface in normal use. Surfaces treated and/or constructed in this manner include the surface materials covering substantially the entire surface, e.g. airplane, missile, etc., for which the low radar reflectivity is desired.

DESCRIPTION OF THE PREFERRED EMBODIMENT

Figure 1:
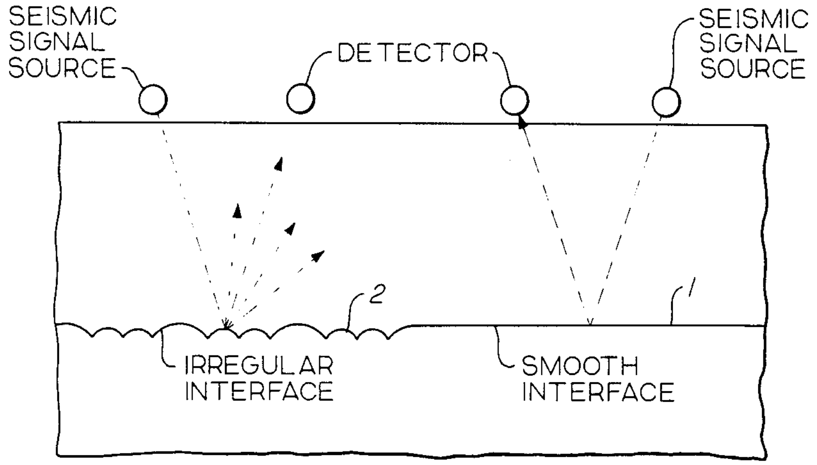
FIG. 1 is a view in vertical section through the earth showing the reflection of seismic signals from smooth and from irregular geological interfaces.

In previous work done by applicant in the field of geophysics, it was discovered that seismic waves passing through the earth are reflected from a smooth interface in a more or less coherent signal form. On the other hand, seismic waves reflected from an irregular interface are severely scattered or dispersed. This is shown schematically in FIG. 1 of the drawings where the reflection from smooth surface 1 and irregular surface 2 is illustrated.

The scatter or dispersion of the signal reflected from an irregular surface substantially reduces the signal measured by the detectors. The amplitude of the reflected signal received by the detector is a measure of detected signal strength. It has been found that:

$$A_{Ri}=A_{Rs}/(1+D/R),$$

where $A_{Rs}$=Amplitude of reflected signal from smooth surface, $A_{Ri}$=Amplitude of reflected signal from an irregular surface, D is the distance from the reflecting surface to the detector, and R is the radius of curvature or the depth or height of individual surface irregularities. In the claims, the term R will be defined as the height of a surface irregularity in a positive or negative sense and therefore means height or depth or, in the case of a spherical irregularity, the radius.

This information was reported by applicant in "Applied Geophysics(USSR)", Vol. 58, Moscow 1970, pp. 97–104. This phenomenon has also been utilized in suppressing multiple reflections in marine seismic exploration, see Igor B. Moshinsky et al. Canadian Patent Application, Ser. No. 336,129, filed Sept. 21, 1979, allowed Dec. 14, 1982.

Figure 2:
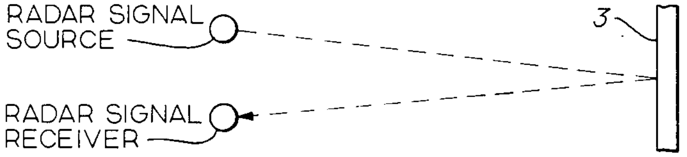
FIG. 2 is a schematic view illustrating the reflection of a radar signal from a smooth surface.
Figure 3:
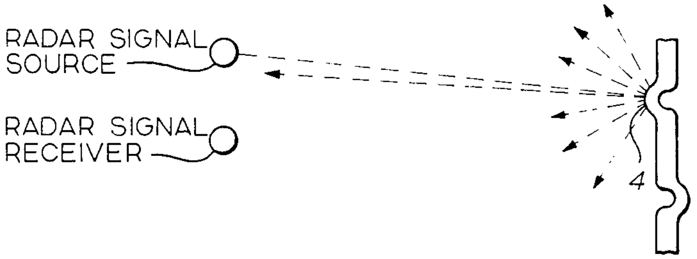
FIG. 3 is a schematic view illustrating the reflection of a radar signal from an irregular surface.
Figure 4:
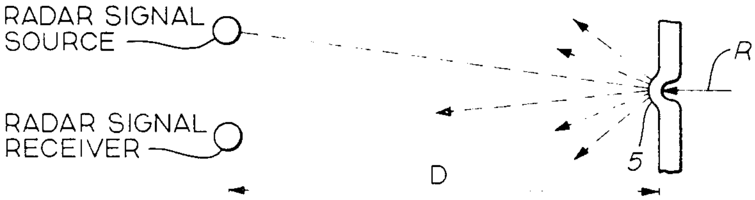
FIG. 4 is a schematic view similar to FIG. 3 showing the dimensions of distance of reflected radar signal and dimensions of surface irregularity of an irregular surface from which the radar signal is reflected.
Figure 4A:
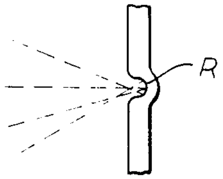
FIG. 4A is a detail view showing an irregularity of the reverse curvature from that shown in FIG. 4. A mathematical formula is also shown giving the relationship of reflected radar signals from smooth and irregular surfaces.

It has also been found that the reflection of radar signals from distant surfaces, such as aircraft or missiles follows the mathematical relationship noted for seismic waves. This is shown in FIGS. 2 and 3 of the drawing which show reflection from smooth surface 3 and irregular surface 4. FIGS. 4 and 4A show the reflection of radar from a raised portion 5 of a surface and from an indentation 6. Additionally, the dimensions D and R are illustrated. Therefore, $$A_{Ri}=A_{Rs}/(1+D/R),$$

where $A_{Rs}$=Amplitude of radar waves reflected from a smooth surface, $A_{Ri}$=Amplitude of radar wave reflected from an irregular surface, D is the distance from the reflecting surface to the detector, and R is the radius of curvature or the depth or height of individual surface irregularities.

Applying this formula to an actual situation, let D=3 km., and R=15 cm. (the wave length of medium length radar waves) for a very finely roughened surface. Then, $A_{Ri}=A_{Rs}/(1+300{,}000/15)$. Thus, for the stated conditions the reflected signal from the irregular surface is only one twenty-thousandth (1/20,000) or $5\times10^{-5}$ of the signal reflected from a smooth surface.

Figure 5:
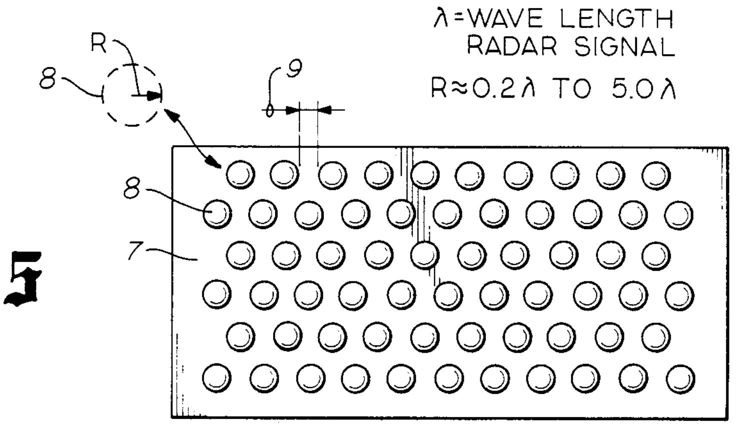
FIG. 5 is a plan view showing the spacing and dimensions for a plurality of surface irregularities covering a surface to produce a maximum dispersion of a reflected radar signal.
Figure 6A:
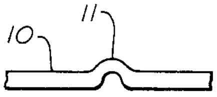
FIG. 6A is a detail sectional view of a raised surface irregularity.
Figure 6B:
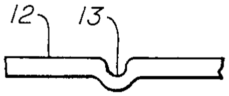
FIG. 6B is a detail sectional view of an indented surface irregularity.
Figure 6C:
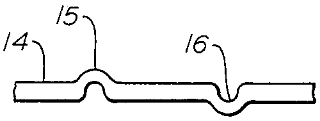
FIG. 6C is a detail sectional view of a surface having both raised portions and indentations.
Figure 6D:
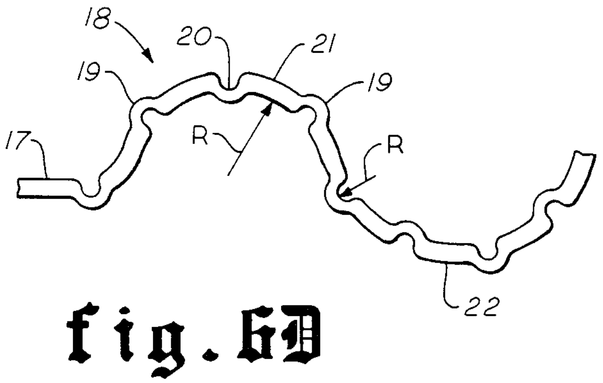
FIG. 6D is a detail sectional view of a surface having compound indented and/or raised irregularities.

In FIG. 5, there is shown schematically a surface 7 having a plurality of surface irregularities 8 spaced thereon in either a random or an ordered manner. The radius of an indentation or a raised portion 8, or the depth or height of an irregularity is indicated as R. The spacing 9, indicated by an arrow, between adjacent irregularities is approximately 2R and is an edge to edge spacing, not a center to center spacing. It has been found that where $\lambda$=the wave length of a radar signal and R is approximately $0.2\lambda$ to $5.0\lambda$, the entire surface scatters or disperses the radar signal on reflection. This can reduce the reflected signal to almost zero as measured at the point of the radar detectors.

In FIGS. 6A, 6B, 6C and 6D, there are shown a variety of types of surface irregularities which may be used in producing a surface which gives a high degree of dispersion of a reflected radar signal. Surface 10 (FIG. 6A) has a raised portion 11. Surface 12 (FIG. 6B) has an indentation 13. Surface 14 (FIG. 6C) has both a raised portion 15 and an indentation 16. Surface 17 (FIG. 6D) has a compound irregularity 18 comprising smaller raised portions 19 and/or indentations 20 impressed on larger raised portions 21 and/or indentations 22.

The surfaces which are provided with the radar dispersing irregularities are structural materials. It is preferred that the material be of a sheet structure, as shown, and that the irregularities be produced by deforming the sheet and thus producing like irregularities on the inside of the sheet material. This will avoid weakening the sheet as would happen if the irregularities were produced by eroding and/or building up the surface in the defined manner.

The structural materials which are provided with the radar dispersing surface, as described above, are preferably used in the construction of aerodynamic bodies, e.g. aircraft or missiles, although it can be used wherever radar dispersion is needed. In the case of aerodynamic bodies, there is a further requirement that the surface irregularities be aerodynamically efficient, permitting smooth flow of air over the surface under normal conditions of use. In such cases, the surface irregularities can be elongated and shaped for smooth non-turbulant flow of air.

Figure 7A:
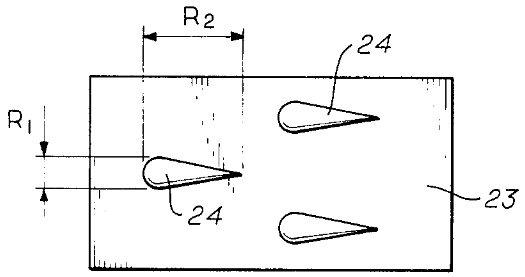
FIG. 7A is a plan view showing a surface having a plurality of irregularities having aerodynamic cross-sections which facilitate air flow over the surface.
Figure 7B:
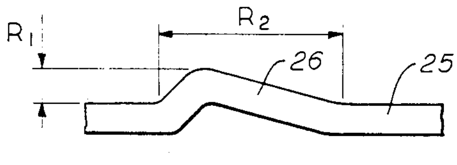
FIG. 7B is a sectional view through one of the surface irregularities of FIG. 7A in which the irregularity is a raised portion.
Figure 7C:
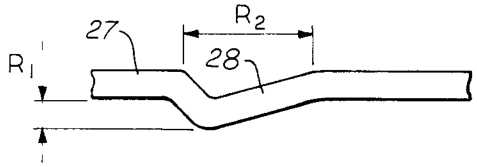
FIG. 7C is a sectional view through one of the surface irregularities of FIG. 7A in which the irregularity is an indentation.

Surface 23 (FIG. 7A) shows surface irregularities 24 which are elongated and tapered for non-turbulant airflow thereover. These irregularities have a minor dimension $R_1$ and major dimension $R_2$ which are within the size range specified above, i.e. 0.2λ to 5.0λ. Surface 25 (FIG. 7B) has a raised portion 26 having a height $R_1$ which is approximately the same dimension $R_1$ defined as the width in FIG. 7A. The length of the raised portion 26 is the same dimension $R_2$ as in FIG. 7A. Surface 27 (FIG. 7C) has an indentation 28 having a depth $R_1$ which is approximately the same dimension $R_1$ defined as the width in FIG. 7A. The length of the indentation 28 is the same dimension $R_2$ as in FIG. 7A.

Figure 7D:
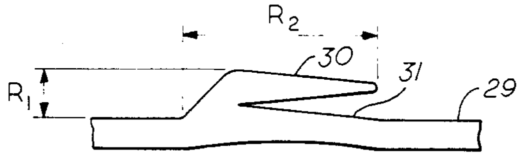
FIG. 7D is a sectional view through a surface irregularity which is raised and partially separated from the rest of the surface.
Figure 7E:
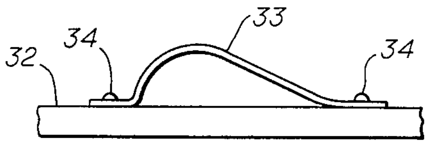
FIG. 7E is a sectional view through another type of surface irregularities of FIG. 7A in which the irregularity is a separate hollow piece rivitted to the surface.

In FIG. 7D, there is shown another type of surface irregularity. Surface 29 has a raised portion 30 of height and width $R_1$ and length $R_2$. Raised portion 30 is separated from the surface 29 toward the rear as indicated at 31. This type of irregularity is formed by a gouging type of action. In FIG. 7E, surface 32 is provided with a plurality of raised members 33 which are separately formed and applied to the surface as by rivets 34. In this case, the length, width and height of members 33, and the rivets 34 are within the dimensional range set forth above.

An aircraft or missile body (or other object requiring like protections against radar) is formed of a structural material with surface irregularities sized and spaced as described above. In the case of aircraft, there is a further problem. The windows must remain transparent for purposes of observation from within. Consequently, each such window may be provided with an internally positioned covering which is shaped to provide a plurality of lenses compensating for the irregularity of light transmitted through the irregularities on the window surface.

OPERATION

The operation of the equipment described above should be apparent from the description of the component parts and assembly thereof. Nevertheless, it will be advantageous to describe the operation more thoroughly with special emphasis upon the advantages of certain features over the prior art.

When an object, such as an aircraft or missile or the like, has its exterior surface formed of a material with surface irregularities sized and spaces as described above, radar signals reflected from such surface are dispersed to the point of giving substantially a zero reading at the location of the radar detectors.

Radar signals are used in a variety of wave lengths for different types of long or short range detection. Short radar waves have a wave length of a few millimeters. Medium radar waves have a wave length of a few centimeters. Long radar waves have a wave length of a few decimeters. The face that the radar encountered may be any of these wave lengths must be taken into account in the design of the surface irregularities.

The surface irregularities should be of a variety of sizes so that they will scatter or disperse any of the various radar wave lengths on reflection. Thus, there should be a number of the surface irregularities sized and spaced according to the formula $R=0.2\lambda$ to $5.0\lambda$ for each of the various wave lengths. The various sizes of surface irregularities may be distributed uniformly or randomly over the surface. It is preferred to use compound irregularities with the larger portion of the irregularities sized to disperse longer radar waves and the smaller portions of the irregularities sized to disperse the medium and short radar waves.

While this apparatus has been described with special emphasis upon a single preferred embodiment it should be understood that within the scope of the appended claims the invention may be practiced otherwise than as specifically described herein.

I claim:

1. A material of construction for causing a substantial dispersion of a radar signal, having a wave length in the short, medium or long range, reflected therefrom, said material having an external surface with irregularities comprising a plurality of surface portions of different height from the general external surface in spaced relation over the entire exterior surface thereof, said irregularities having a height R of about 0.2 to about 5.0 times the wave length of the radar signals, and said irregularities having a spacing approximately 2R of about 0.2 to about 5.0 times the wave length of the radar signals.

2. A material of construction according to claim 1 for causing a substantial dispersion of radar signals of a variety of wave lengths in the short, medium and long range on reflection of such signals therefrom in which said irregularities are variable in height from about 0.2 to about 5.0 times the shortest wave length of said radar signals to about 0.2 to about 5.0 times the longest wave length of said radar signals, and said irregularities are variable in spacing from about 0.2 to about 5.0 times the shortest wave length of said radar signals to about 0.2 to about 5.0 times the longest wave length of said radar signals.

3. A material of construction according to claim 2 in which said variably sized and spaced irregularities are randomly spaced on said exterior surface.

4. A material of construction according to claim 2 in which said variably sized and spaced irregularities are spaced on said exterior surface according to a predetermined pattern.

5. A material of construction according to claim 1 in which said surface irregularities are raised portions.

6. A material of construction according to claim 1 in which said surface irregularities are indentations.

7. A material of construction according to claim 1 in which said surface irregularities are indentations and raised portions.

8. A material of construction according to claim 4 in which said irregularities are compound in structure with a smaller indentation or raised portion comprising a part of a larger indentation or raised portion.

9. A material of construction according to claim 8 for causing a substantial dispersion of radar signals of a variety of wave length in the short, medium and long range on reflection of such signals therefrom in which said compound irregularities are variable in size from a depth or height or radius of curvature of about 0.2 to about 5.0 times the shortest wave length of said radar signals to about 0.2 to about 5.0 times the longest wave length of said radar signals, and said compound irregularities are variable in spacing from about 0.2 to about 5.0 times the shortest wave length of said radar signals to about 0.2 to about 5.0 times the longest wave length of said radar signals, whereby said surface causes a reflected dispersion of the entire range of radar wave lengths from the shortest to the longest from the different sizes of indentations or raised portions.

10. A material of construction according to claim 1 for the surface of missiles or airplanes for causing a substantial dispersion of radar signals on reflection of such signals therefrom in which said irregularities have an elongated shape configured in cross-section to provide a smooth aerodynamically efficient surface in the direction of air flow over the surface in normal use.

11. A material of construction according to claim 10 in which said elongated irregularities each have a major and a minor dimension within the specified range of size and spacing.

12. A material of construction according to claim 1 in which said material is in a sheet form and said irregularities are produced by deformation of the sheet material while leaving the sheet material substantially uniform in thickness.

13. An aerodynamic body having its exterior surface formed of at least one material of construction as defined in claim 1.

14. An aerodynamic body having its exterior surface formed of at least one material of construction as defined in claim 2.

15. An aerodynamic body having its exterior surface formed of at least one material of construction as defined in claim 3.

16. An aerodynamic body having its exterior surface formed of at least one material of construction as defined in claim 4.

17. An aerodynamic body having its exterior surface formed of at least one material of construction as defined in claim 5.

18. An aerodynamic body having its exterior surface formed of at least one material of construction as defined in claim 10.

19. An aerodynamic body having its exterior surface formed of at least one material of construction as defined in claim 11.

20. An aerodynamic body having its exterior surface formed of at least one material of construction as defined in claim 12.

* * * * *